United States Patent [19]
Breed et al.

[11] Patent Number: 5,231,253
[45] Date of Patent: * Jul. 27, 1993

[54] SIDE IMPACT SENSORS

[75] Inventors: David S. Breed, Boonton Township, Morris County, N.J.; Vittorio Castelli, Yorktown Heights, N.Y.; Anthony S. Pruszenski, Jr., Plum Island, Mass.

[73] Assignee: Automotive Technologies, International, Mountain Lakes, N.J.

[*] Notice: The portion of the term of this patent subsequent to Oct. 13, 2009 has been disclaimed.

[21] Appl. No.: 896,496

[22] Filed: Jun. 2, 1992

Related U.S. Application Data

[63] Continuation of Ser. No. 480,273, Feb. 15, 1990, abandoned, which is a continuation-in-part of Ser. No. 314,603, Feb. 23, 1989, abandoned.

[51] Int. Cl.⁵ .............................................. H01H 35/14
[52] U.S. Cl. .......................... 200/61.45 R; 200/61.48
[58] Field of Search .................. 200/61.45 R–61.53; 307/10.1; 280/730–735

[56] References Cited

U.S. PATENT DOCUMENTS

| | | | |
|---|---|---|---|
| 2,369,977 | 2/1945 | O'Toole | 200/61.51 |
| 3,753,474 | 8/1973 | Dillman | 200/61.52 X |
| 4,013,851 | 3/1977 | Abbondante | 200/86 R |
| 4,028,516 | 6/1977 | Hirashima et al. | 200/61.48 X |
| 4,201,898 | 5/1980 | Jones et al. | 200/61.51 X |
| 4,249,046 | 2/1981 | Livers et al. | 200/61.49 X |
| 4,262,177 | 4/1981 | Paxton et al. | 200/61.48 X |
| 4,321,438 | 3/1982 | Emenegger | 200/61.48 X |
| 4,329,549 | 5/1982 | Breed | 200/61.45 M |
| 4,816,627 | 3/1989 | Janotik | 200/83 N X |
| 4,851,705 | 7/1989 | Musser et al. | 307/10.1 |
| 4,900,880 | 2/1990 | Breed | 200/61.45 M |
| 4,902,861 | 2/1990 | Cook | 200/61.48 |
| 4,932,260 | 6/1990 | Norton | 200/61.53 X |
| 4,966,388 | 10/1990 | Warner et al. | 280/730 |
| 4,980,573 | 12/1990 | White et al. | 307/10.1 |
| 4,987,316 | 1/1991 | White et al. | 307/10.1 |
| 4,995,639 | 2/1991 | Breed | 280/735 |
| 5,010,216 | 4/1991 | Sewell et al. | 200/61.45 M |

FOREIGN PATENT DOCUMENTS 2225660  6/1990  United Kingdom .

OTHER PUBLICATIONS

"Airbag System For Side Impact Protection" of J. A. Olsson et al, 12th International Technical Conference on Experimental Safety Vehicles, Proceedings vol. 2, May 29–Jun. 1, 1989, pp. 976–983.

"Crash Protection In Near Side Impact, Advantages of a Supplemental Restraint", by C. Y. Warner et al., SAE International Congress and Exposition, Feb. 27–Mar. 3, 1989.

"Inflatable Structures For Enhanced Side Impact Crash Protection", Collision Safety Engineering Inc., SBIR Proposal 87-NH2, May 1, 1987, pp. 5–23.

Primary Examiner—J. R. Scott
Attorney, Agent, or Firm—Sprung Horn Kramer & Woods

[57] ABSTRACT

This invention includes crash sensors designed to be used for side impact sensing and the strategies of using these sensors. If is analyzed and shown that velocity sensing or damped sensors are desirable for side impact sensing. Inertially damped sensors, with a damping force proportional to the square of velocity, is most appropriate. Such sensor can be made of plastic and in the shape of short round or rectangular cylinders. It is further concluded that these sensors should be installed on the side door structure of a vehicle. Other sensing strategies include installing sensors on three locations: one at the center of the side door, one just before the A-pillar, and one just after the B-pillar; and Safing (arming) sensors for side impact applications could be crush sensing switches.

45 Claims, 11 Drawing Sheets

SIDE IMPACT SENSORS

CROSS REFERENCE

This application is a continuation of application Ser. No. 07/480,273, filed Feb. 15, 1990, now abandoned which is a continuation-in-part of application Ser. No. 07/314,603, filed Feb. 23, 1989, now abandoned.

BACKGROUND OF THE INVENTION

Air bag passive restraint systems for protecting automobile and truck occupants in frontal collisions are beginning to be adopted by most of the world's automobile manufacturers. It has been estimated that by the mid-1990's all new cars and trucks manufactured will have air bag passive restraint sytems. These air bag systems are designed to protect occupants in frontal impacts only. Many people, however, are killed or seriously injured in side impacts, which typically involves one car running into the side of a second vehicle.

Approximately, one quarter of all injury-producing accidents in 1981, for example, were side impacts in which the direction of the force was determined to be within 45 degrees of the lateral axis of the vehicle. According to the National Highway Safety Council of the National Highway Traffic Safety Administration, 22% of all fatalities were caused by interior side surfaces of the vehicle as compared to 68% of fatalities caused by frontal impacts that includes the steering wheel, windshield frame, instrument panel, and windshield. Since air bags are well on their way to alleviating injuries from frontal impacts, it is important now to focus on the next largest killer, side impacts.

In frontal impacts, the crush zone of the vehicle changes velocity early in the crash and sensors located typically within 12 inches of the front of the vehicle can, in most cases, sense the crash and initiate the inflation of the air bag long before the occupant has begun to move relative to the passenger compartment. Also, for most cases, there is little intrusion in the passenger compartment and thus the entire space between the occupant and the instrument panel or the steering wheel is available to cushion the occupant. In contrast, in side impacts there is almost always significant intrusion into the vehicle and the motion of the occupant relative to the vehicle interior begins immediately after impact. In addition, there is far less space for a restraint system and thus the injury-reducing potential of an air bag even if it were deployed in time, is substantially less for side impacts than for frontal impacts. For frontal impacts, air bags are designed to cushion a 50 percentile male in a vehicle travelling at 30 MPH into a barrier. It is unlikely similar protection for an absolute velocity change of the passenger could be achieved in side impacts for for the reasons listed above without major modifications to vehicle side structures. Nevertheless, a significant percentage of side impacts occur at velocities low enough where an air bag could be of significant help in mitigating injuries.

To design a crash sensor for side impacts, the side-intrusion characteristics of a vehicle and the behavior of various parts of a vehicle during a side impact must be studied and fully understood. In a technical paper by V. Castelli and D. Breed, "Trends in Sensing Side Impacts," (SAE 890603) presented at the 1989 SAE Congress and Exposition in Detroit, the side intrusion problems and general vehicle response characteristics are discussed. In this paper, it is assumed that the marginal condition for an occupant to be critically injured occurs when the occupant impacts the side door panel at a critical speed "V-cr". A relative velocity of 10 to 12 miles per hour has typically been considered a reasonable threshold. Based on this criterion, the desired response curve of a side impact crash sensor can be determined by the impact conditions, such as vehicle-to-vehicle, vehicle-to pole, or truck-to-vehicle accidents. The following discussion, includes a brief summary of the aforementioned paper. For additional details, please refer to the paper.

The behavior of a struck vehicle depends on the striking object. Since most of the side impact accidents involve one vehicle impacting a second vehicle, consideration of this type of car-to-car crash is essential for the design of crash sensors. Define the struck vehicle as the "target" vehicle, and the striking vehicle as the "bullet" vehicle. For the discussion of side intrusion, consider the target vehicle comprising two parts: the side door beam and outer panel, and the passenger compartment. Once the side door is hit by the bullet vehicle, the door beam and outer panel deforms significantly while the passenger compartment only gains a relatively small velocity change in the early stage of a crash. The side intrusion or crush increases continuously after the early penetration until the entire car reaches a common final velocity later in a crash. The responses of the target and bullet vehicles are functions of the impact angle and location, the impact speed, and the stiffness and weights of the vehicles.

The velocity of the side door panel increases immediately after the impact to a maximum velocity comparable to the velocity of the bullet vehicle, V1. This rapid rise in velocity can happen within five to ten milliseconds. The passenger compartment experiences a relatively small velocity change during this stage of the crash. The difference in velocity between the side door and the passenger compartment manifests itself in the crush of the vehicle. As the side structure stiffens in the deep post-buckling range, the resistance force increases and starts to decelerate the side door panel until finally the side panel and the passenger compartment reach a common velocity, V2. This final velocity is estimated to be the momentum velocity, which is the original momentum of the bullet vehicle divided by the total masses of the bullet and target vehicles, assuming that the friction between the road surface and the vehicles is negligible and a perfectly plastic collision occurs. For two vehicles of the same mass and a 90° impact of the moving bullet into a stationary target, the final velocity, V2, will be approximately equal to one half of V1.

Another critical parameter in the design of side impact sensor is the time when the occupant is hit by the side door inner panel, designated as t-hit. The deciding factors that influence t-hit are the stiffness of the vehicles, the impact condition, and the distance between the occupant and the side panel. In most of the side impact cases, t-hit occurs before the side door panel reaches the final velocity, V2. A crash sensor must trigger ahead of t-hit to allow the protective apparatus to deploy at an earlier time, defined as t-trigger. The gap between t-hit and t-trigger is the period needed for the inflatable system to deploy.

The velocity, at which the side door hits the occupant, is defined as V-hit. If the two vehicles are of equal weight in the 90° impact described above, then the peak of velocity change of the side door panel can be as high as two times V-hit. For example, if V-hit is equal to 10 MPH, then the side panel of the target vehicle can experience a velocity rise up to about 20 MPH before it decelerates and finally reaches the final speed. In the marginally critical crashes, V-hit is equal to V-cr. This observation reveals that a crash sensor located at center points in the side door must require a velocity change higher than V-cr in an impulsive pulse, such as pulses in the range of 1–5 ms to trigger. Otherwise, if a crash sensor is responsive to an impulsive pulse with a velocity change of V-cr, then in many cases when the side door panel experiences a rapid velocity change of V-cr but finally a drop to one half of V-cr for equal mass vehicles, there will be many undesired initiations of the protection apparatus.

The above discussion on the velocity change, to which a crash sensor must respond, is based on the assumption that a velocity-type sensor is placed on the side door beam. A velocity-type sensor is a sensor which integrates a crash pulse and triggers when the velocity change exceeds a threshold value. Since a side impact crash sensor must not falsely trigger due to hammer blows or light pounding on the side door, which can cause significant local deformations on the side door, side door deformation can not be used as the only criterion for detecting the severity of a side impact accident. A side impact displacement type sensor which responds to the crush of the side door panel, therefore, could cause frequent inadvertent sensor triggering. A side impact sensor must also trigger for other side crashes when the side door is not directly hit but the impact is severe enough so that the occupant needs the protection of an inflatable system. A displacement-type sensor in these cases will not trigger until the side crush of the vehicle progresses to the location of the sensor. This will result in late triggering or no triggering of the sensor and no protection for the occupant. On the other hand, a velocity-type sensor will simply respond to the velocity change sensed in a crash, thus it can be adjusted to a desired sensitivity to predictably detect the occurrence of a side impact even though the side door is not hit directly. Based on the above observations, the velocity type sensor is appropriate for side impact inflatable systems. To ensure the effectiveness of sensing, it is reasonable that more than one sensor be used for side impact sensing, for example, one would be located just before the A-pillar, one just after the B-pillar, and one at the center of the side door. By implementing such a sensing system, it can be assured that at least one sensor will trigger for almost all side crashes in which the protection apparatus is needed.

Even though spring-mass inertial sensors also respond to a specified range of velocity changes, the sensitivity of these sensors increases as the pulse duration decreases. This means that these sensors will trigger with a smaller velocity change for pulses of shorter duration than longer duration. This trend contradicts the conditions of side impact sensing. On the other hand, viscously damped sensors, such as conventional ball-in-tube sensors, (as disclosed in U.S. Pat. Nos. 3,974,350, 4,198,864, 4,284,863 and 4,329,549 all to D. Breed) respond to the same velocity change regardless of pulse duration. These sensors also do not meet the requirements of side impact sensors, which requires greater insensitivity for short, impulsive velocity changes. In inertially damped sensors, the motion of the sensing mass is opposed by a nonlinear damping force, such as a resisting force depending on the second power of the velocity induced by fluid flow through a restrictor such as an orifice. These sensors are naturally more sensitive to long pulses than to short pulses, but the sensitivity to very long pulses can be compensated by a high bias force. The ability to tailor the characteristics of these sensors in the range of pulses 5 to 50 ms makes them most appropriate for side impact sensing.

A crash sensor for sensing side impacts must be placed on the side door structure to be effective. This location is essential since it is sensing the velocity change of the portion of the vehicle which will eventually strike the occupant and therefore serves as a good predictor of V-cr. If this sensor is placed on the door beam just inside the door outer panel, it will respond very quickly to the impact. If the sensor were placed at some other location in the vehicle, it would necessarily respond more slowly to a side impact into the door. Any crash sensor, to function properly, must be designed to operate either in the crush zone or out of the crush zone. Since there is insufficient signal anywhere else in the vehicle for side impacts, they can only be sensed in time with crush zone sensors. This sensor, therefore, must be in the appropriate crush zone in order to sense the crash in time. If the side door is not hit directly, the pulse propagated to the side door is delayed and stretched in its duration, as compared to the pulse generated in a direct side door impact. Therefore, to be effective, a crash sensor must be more sensitive to these longer or stretched pulses.

In another extreme case, such as hitting a soft cushion, the whole target vehicle may be subjected to a side velocity change while there is not penetration or deformation to the side door, and the occupant will move toward the side door and eventually hit the inside panel. Suppose V-cr is equal to 10 MPH and the gap between the occupant and the inside door panel is typically about 5 inches, then t-hit is approximately equal to 57 milliseconds assuming that the occupant travels with an average of 5 MPH from a zero initial velocity to a final 10 MPH speed. Notice that the side door panel and the passenger compartment in this case experience the same pulse. This indicates that at t-trigger, which is ahead of t-hit by a period needed for deployment, a sensor located on the side panel must respond to a velocity lower than V-cr. Even though these conditions are very rarely encountered, they can provide a guideline for the sensor design for pulses in the range of 30 to 45 milliseconds. For example, if a pulse of 50 milliseconds duration with a velocity change of 10 MPH is considered a marginal pulse, then the sensor will need to respond predictably to a velocity change of 6 to 8 MPH in the range of 30 to 40 milliseconds.

It may be desirable for a side impact sensing system to include safing (arming) sensors in addition to the discriminating sensors described above. In frontal impacts, velocity-type low-bias sensors located in the passenger compartment are used for safing purposes. In side impact crashes, however, the crash pulse in the passenger compartment does not provide enough information at the time when the crush zone sensor is required to trigger. Therefore, it is difficult to use a passenger-compartment safing sensor for a side impact sensing system. Safing sensors for side impact application could be crush sensing switches. These safing sensors should be placed in proximity to the velocity sensing sensors, and should have long contact dwells. A combination of a velocity sensing sensor and a crush sensor significantly reduces the probability of an inadvertent deployment by imposing a requirement that two environmental stimuli (velocity change and physical displacement) are required to initiate air bag deployment.

SUMMARY OF THE INVENTION

To satisfy the various requirements for a side impact sensor, it is concluded that a sensor having an inertial mass is required; a damped sensor is desired; and, an inertially damped sensor is most adaptable to properly sensing side crashes. It is also disclosed that a combination of three sensors, one just before the A-pillar, one just after the B-pillar, and one at the center in the side door, is most desirable for side impact sensing. Some small cars may need only two discriminating sensors per side. A crush sensitive safing sensor in series with and located proximate to the velocity change sensor is also desirable to minimize the chance of inadvertent air bag deployment.

It is a principal object of this invention to provide a crash sensor having an inertial mass for use with side impact protection apparatus.

It is another object of this invention to provide a sensing device, for use with a side impact restraint system which minimizes the risk of inadvertent actuation.

It is an additional object of this invention to provide an easily manufacturable sensor which is inexpensive to make.

It is another object of this invention to provide a inertial flow sealed crash sensor which maintains a constant gas density and thus is minimally affected by temperature changes.

It is a further object of this invention to provide a crash sensor which is insensitive to the variations of ambient temperature.

It is a further object of this invention to provide for at least two discriminating sensors per vehicle side.

Other objects and advantages of this invention will become apparent from the disclosure which follows.

DETAILED DESCRIPTIONS OF PREFERRED EMBODIMENTS

Figure 1:
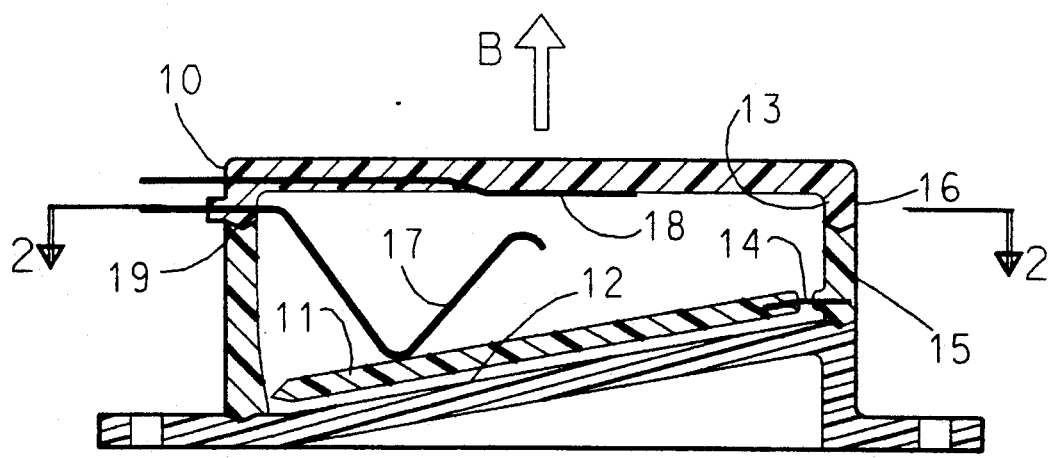
FIG. 1 is a transverse cross sectional view of a square plastic side impact sensor containing an integral molded hinge.
Figure 2:
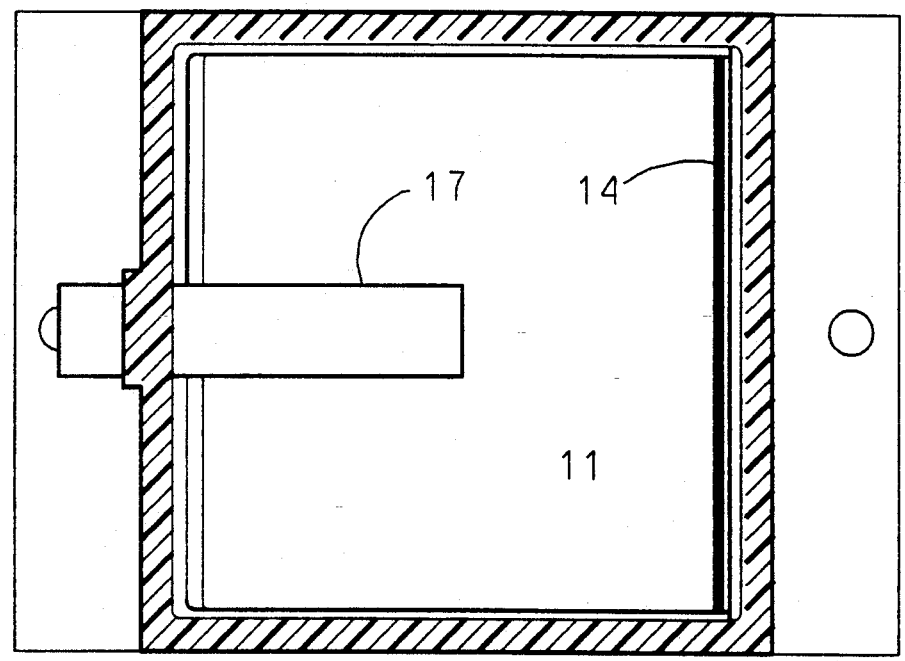
FIG. 2 is a cross sectional view taken along lines 1—1 of FIG. 1.

One preferred embodiment of this invention is manufactured as a thin square or rectangular housing with a width slightly larger then 2 inches and a thickness of 0.5 to 0.75 inches FIG. 1 is a cross sectional view of such a side impact sensor 10. A member of flapper 11, initially resting on an inclined surface 12, is hinged to the inside surface of the housing 13 by a plastic or metal hinge 14. The housing comprises a left casing 15 and a right casing 16. A first contact 17, attached to the housing 13, biases the flapper 11 toward its initial position. A second contact 18 is also fixed to the housing 13. When installed on a vehicle for side impact sensing, the right side of the sensor faces the outside of the side door in the direction of the arrow B.

When the sensor is subjected to a crash pulse of enough magnitude and duration, the flapper 11 moves toward the second contact 18. After a specified travel, the first contact 17 makes engagement with contact 18 and closes an electrical circuit to initiate deployment of the protection apparatus associated with the sensing system. The first contact is flexible and allowed to deflect further beyond the triggering position. Therefore, the flapper can travel over and beyond the triggering position until it is stopped by the wall 19 of the housing. This over travel is necessary in order to provide a long contact duration or dwell. If the acceleration of the crash pulse drops below the bias level later in the crash, then the flapper moves back toward its initial position under the biasing force of the contact 17.

Flapper 11 and the left housing casing 15 can be produced as a single plastic piece by injection molding. The flapper and the housing are attached by a plastic hinge formed in the manufacturing process or by a betal, plastic or other material hinge insert molded during the molding process. A candidate for the plastic material with well known hinge properties is polypropylene, which is strong and durable enough to provide a flexible bonding between the flapper and the housing. Since it is difficult to maintain tolerances in unreinforced polypropylene, other plastics would be more suitable for some applications.

The right side of the housing 16 is also to be made of plastic and formed by injection molding, while the contacts 17 and 18 are made of conductive metals and can be inserted into the plastic part in the molding process. These contacts are thereby combined into a single piece to be assembled with the left side of the sensor. The assembly of the sensor is completed by combining the two parts of the housing by heat sealing, ultrasonic sealing, through use of a compression sealing ring (not shown) or other suitable sealing method. With the appropriate metal-plastic adhesive coating on the metal pieces, the metal parts and the plastic can be bonded within the range of the operating temperature of a sensor. This manufacturing technique hermetically seals the sensor assuring that the gas density remains constant and prevents moisture and dust from entering the sensor.

A major difference between the sensor according to this invention and a typical ball-in-tube sensor is the damping effect provided by the gas flow. The gas flow in this embodiment of the invention is of the inertial type. Therefore, the resisting force caused by the pressure difference is proportional to the second power of the gas velocity. Viscous damping utilized in ball-intube sensors, on the other hand, is linearly proportional to the gas flow velocity. Inertial type damping is not dependent on the viscosity but instead on the mass flow of the gas and therefore is insensitive to temperature changes, assuming that the sensor is sealed and gas density is therefore kept constant.

The motion of the flapper is determined by the bias, the pressure force, and the inertial force caused by the crash pulse. The size of the flapper of the preferred embodiment can be in the range of 1.5 to 3 inches, which is much larger than the diameter of other known crash sensors. This large size has two significant advantages. First, the clearance between the flapper and the housing becomes large in comparison to conventional ball-in-tube sensors, for example. Thus the tolerance on this clearance is also sufficiently large as to permit the parts to be molded from plastic. Furthermore, if both parts are molded simultaneously in the same mold, this clearance can be held quite accurately. Also, for inertial flow, the resistance to gas flow is proportional to the first power of the clearance while for viscous flow, it is proportional to either the third power (for a cylindrical piston) or the 2.5 power (for a spherical piston). This further reduces the effect of manufacturing variations on the clearance and improves the accuracy of the sensor.

Although not shown in the drawings, the sensors of this invention can contain a mechanism for adjusting the initial position of the flapper to compensate for the remaining tolerances. For all of the above reasons, a sensor which is considerably more accurate than any currently available mechanical crash sensor, results. Furthermore, the large width and thin shape of the preferred sensors is well adapted for sensing side impacts since the tendency will be for the sensor to align itself such that the principle direction of force is parallel to the axis of the flapper. A small sensor, for example, might rotate so as to place its sensitive axis in a direction substantially different from the principle direction of force "Width" herein refers to the maximum horizontal dimension of the sensor and "height" refers to the maximum vertical dimension of the sensor.

This ability to make the sensor entirely from plastic (with the exception of the contacts) makes this sensor quite easy to manufacture and very inexpensive to produce. To ensure that the sensor is hermetically sealed, the metallic parts can be first coated by a bonding material which adheres to both the contacts and the plastic. It is known that the contacts and the plastic have different thermal expansion coefficients and thus, if they are not treated, they could separate when the temperature changes, resulting in leaks. One coating material which is resilient and adhesive and prevents the separation of the metal and plastic materials within the normal crash sensor operating temperature range, usually specified at $-40°$ F. to $250°$ F., is disclosed in the U.S. Pat. No. 3,522,575 to Watson et al and is new to the field of crash sensors. The coating material mentioned in the Watson et al patent is a phenolic resin with 6 percent content of polyvinyl chloride. This manufacturing method not only eliminates the need of additional assembly steps, but also provides the hermetical sealing for the sensors.

Figure 10:
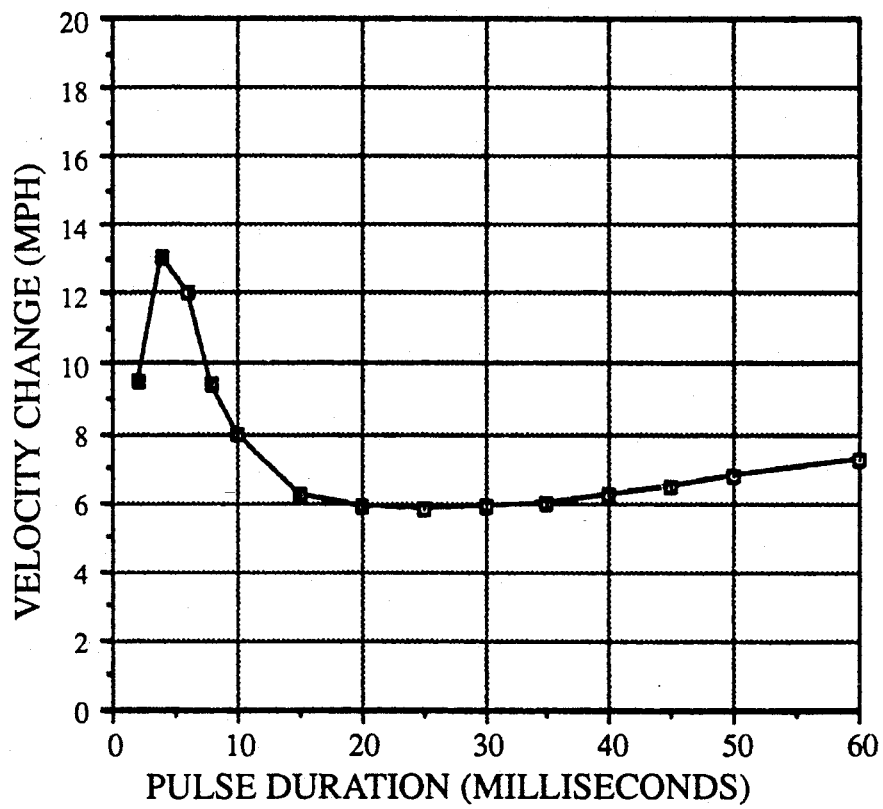
FIG. 10 is a typical response curve of a preferred embodiment of the invention using inertial gas flow.

In an inertially damped sensor, the velocity change required to trigger the sensor depends on the duration of the crash pulse. The sensor requires a much larger velocity change to trigger for short duration pulses than for long duration pulses. The bias is used to adjust the sensitivity of the sensor to long duration pulses. A typical response curve is shown in FIG. 10 for an inertially damped sensor. The curve shows the marginal trigger/no-trigger response to a haversine acceleration input pulse having varying durations (horizontal axis) and varying velocity changes (vertical axis). The sensor will trigger for all pulses having a velocity change above the curve and not trigger for all velocity change pulse duration combinations lying below the curve.

A typical embodiment of the sensor shown in FIG. 1 would utilize a flapper with a width of 2 inches, a diametrical clearance of 0.02 inch and a flapper mass of 3 grams. The average bias provided by the contact element 17 would be between 8 and 10 G's. This configuration achieves a desired response curve for a sensor where the V-cr of 10 miles per hour is desired.

Figure 4:
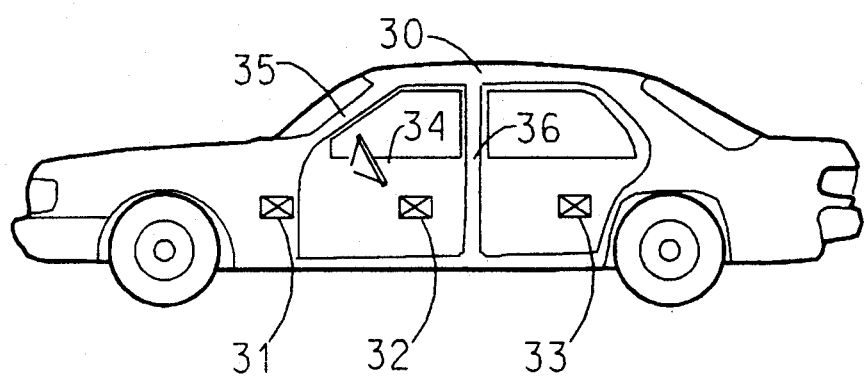
FIG. 4 shows a side view of a vehicle illustrating the preferred mounting locations of side impact sensors.

The thin pancake shape of the sensor of this invention lends itself to be easily mounted in the preferred locations for sensing side impacts. These locations include in the center of the side door 32, plus in front of the A-pillar 31 and just behind the B pillar 33 as shown in FIG. 4. In each case, the sensor would be mounted just inside the sheet metal skin of the vehicle, and attached to a beam or support member. These three sensors are electrically wired in parallel. If any of these three sensors triggers in a side crash, then the protection apparatus is initiated.

Figure 3A:
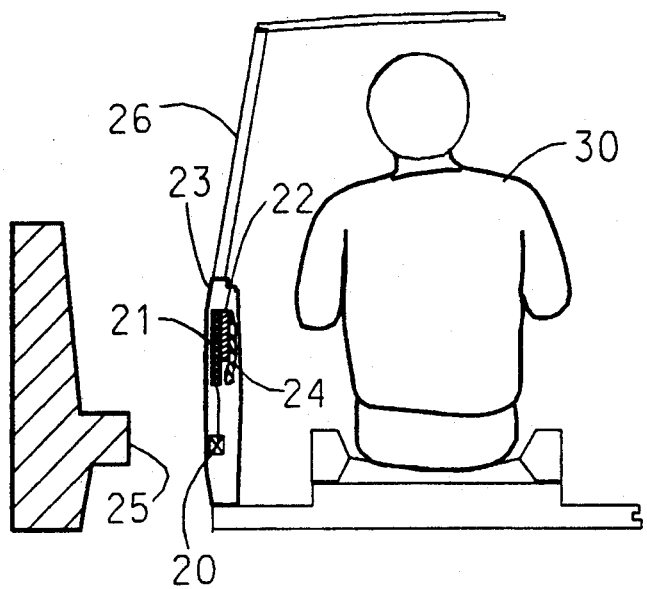
FIGS. 3A—3C are illustrations of a side impact protection system shown in different stages of deployment during a crash.
Figure 3B:
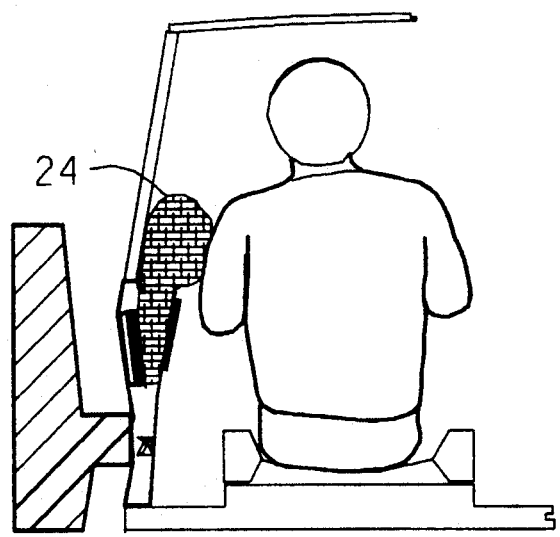
Figure 3C:
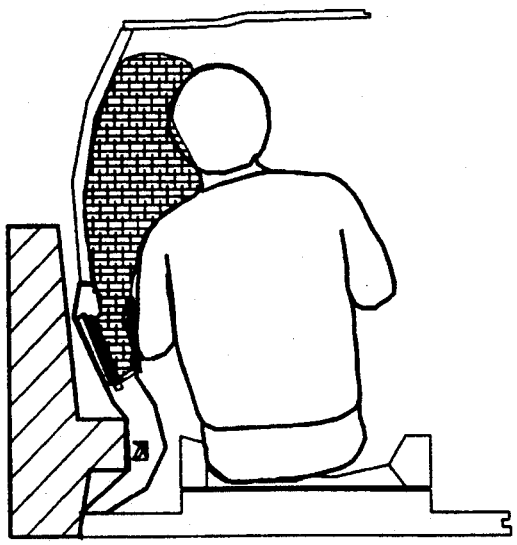

FIGS. 3A-3C illustrate the deploying process of an air bag for side impact protection. The inflator 21 and the bag 22 are stored between the door outside panel 23 and the inner panel 24. In a side impact accident, the bumper of the bullet vehicle 25 penetrates the side door of the target vehicle. After a discriminating sensor 20, plus a safing sensor (if present) as described below trigger, the bag starts to deploy and fills the gap between the occupant 30 and the door by pushing and displacing the inside panel 24. In some designs the air bag merely fills the space between the occupant and the door, and does not attempt to cushion the impact of the occupant's head against the window. In other designs, the air bag is considerably larger and pushes the occupant away from the intruding door. In this latter configuration, a greater level of protection is achieved through accelerating the occupant away from the door before the door intrudes to impact the occupant.

Figure 5:
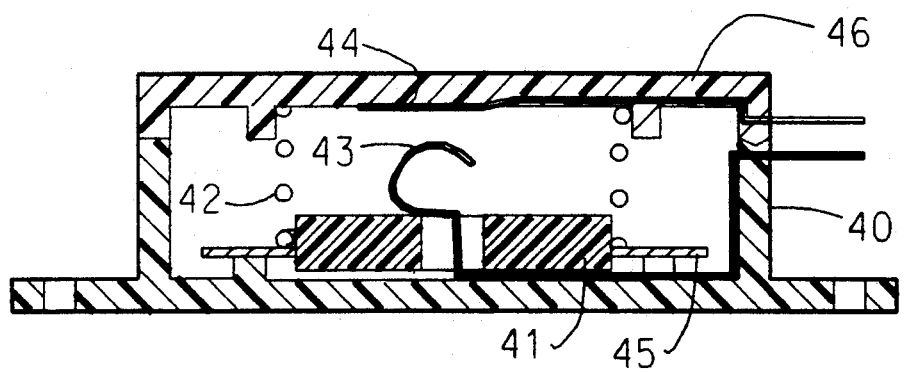
FIG. 5 is a transverse cross sectional view of a simple spring-mass with a large cross section dimension and a relatively small thickness.

Side impact sensing is a new field. The only prior art in the literature utilizes a crush sensing switch as a discriminating sensor to detect a side crash. As discussed above, such a sensor will lead to frequent inadvertent triggering due to local deformations. Therefore, a velocity sensing device is desirable and inertially damped, velocity change sensors are the most suitable. Nevertheless, spring mass type sensors have the advantage of being simple and easier to implement. FIG. 5 is an example of a spring-mass sensor 40. It consists of a sensing mass 41, a biasing spring 42, and a pair of contacts 43 and 44. The sensing mass 41, mounted in disk 45, is held at an initial position by the biasing spring 42. In a crash, the sensing mass 41 moves toward the end 46 of the housing and closes contacts 43 and 44 if the crash pulse is of enough magnitude and duration.

Figure 6:
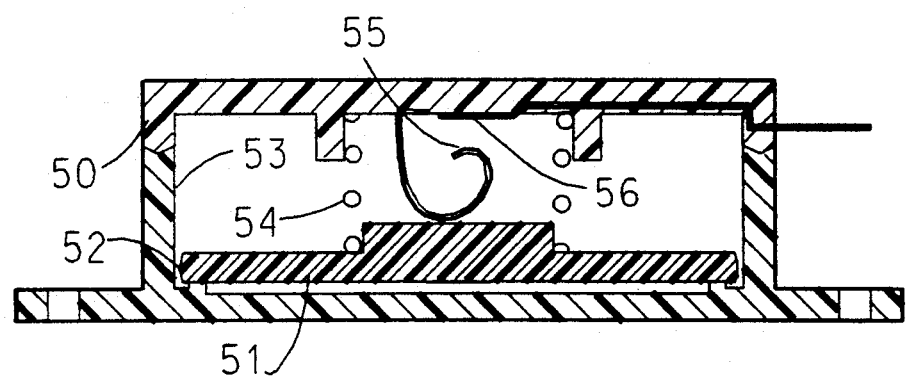
FIG. 6 is a transverse cross sectional view of a viscously damped disk sensor with a relatively large diameter and a short travel.

Similarly, FIG. 6 depicts a viscously damped sensor 50 adapted to be used for side impact sensing. A disk 51 with an arc edge 52 is arranged to move in a cylinder 53. A spring 54 provides the biasing force. Contacts 55 and 56 will close an electrical circuit if the disk moves to a specified position. Due to the tight clearance and the large area on the arc edge, the flow through the clearance when the disk is moving is of the viscous type.

Such gas flow can provide a damping force linearly proportional to the velocity of the disk. The curved edges 52 of the disk permit it to rotate or roll about any contact point between it and the cylindrical housing 53. This design substantially eliminates the effects of sliding friction regardless of the direction of force. The materials for the disk and cylinder must, of course, be chosen with different thermal expansion coefficients to compensate for the viscosity change of the gas with temperature as taught in the above referenced patents on ball-in-tube sensors.

Figure 7:
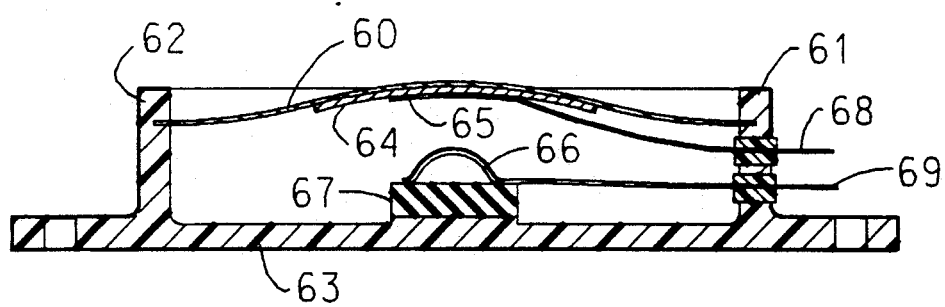
FIG. 7 is a transverse cross sectional view of a crush sensing safing sensor.

FIG. 7 is one embodiment of a crush sensing switch to be used as the safing sensor as part of a sensor system for side impacts. A deformable dome-shaped membrane 60 is supported by a cylindrical element 61, which is extended from a base 63. The membrane 60, preferably made of spring steel, is coupled with an insulating layer 64 and a conductive contact 65. A dome-shaped second contact 66 is insulated from the base 63 by an element 67. Contacts 65 and 66 are connected through a cylindrical element 61 by flexible leads 68 and 69. When installed on the side structure of a vehicle, the membrane 60 is facing the outside of the vehicle. When a crush occurs, the membrane 60 is pushed and deformed downward and contacts 65 and 66 closes an electrical circuit. Other switch designs such as disclosed in the U.S. Pat. No. 4,995,639 of D. Breed could also be used as safing sensors in series with the discriminating sensors described herein.

Figure 8:
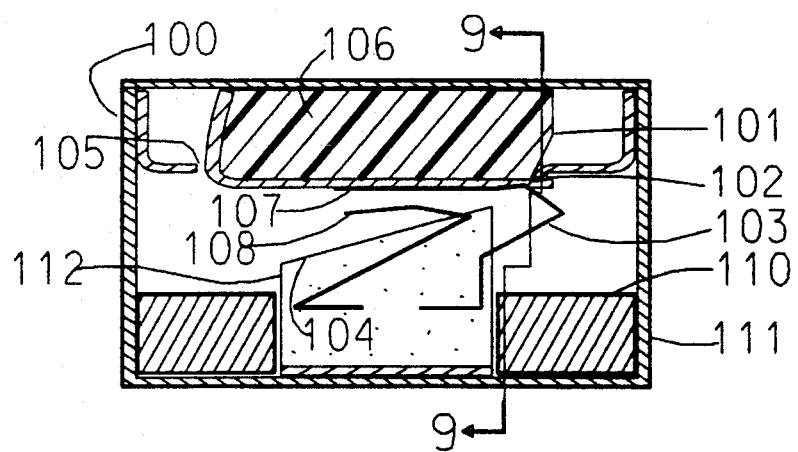
FIG. 8 is a transverse cross sectional view of another preferred embodiment of a testable side impact sensor having a rectangular metal housing.

FIG. 8 depicts an alternate preferred design of an inertial flow side impact crash sensor which is manufactured from metal and is testable. Some automobile manufacturers have a requirement that crash sensors be testable. At some time, usually during the start up sequence, an electronic circuit sends a signal to the sensor to close and determines that the contacts did close. In this manner, the sensor is operated and tested that it is functional. The testable sensor 100 of FIG. 8 consists of a metal flapper 101 which is hinged using a knife edge hinge 102. The flapper 101 is held against the knife edge 102 by a contact which double as a support spring 103 which exerts both a horizontal force and a bias moment onto the flapper. During operation, the flapper 101 is acted upon by inertial forces associated with the crash and begins rotating around the pivot 102. A small motion of the flapper however, expands the gas behind it creating a pressure drop which resists the motion of the flapper. This pressure drop is gradually relieved by the inertial flow of the gas through the clearance 105 between the flapper 101 and orifice plate 106. If the crash is of sufficient severity, the flapper 101 rotates until the contact 107 of the contact spring 103 contacts the contact 108 of the contact spring 109 and completes the electrical circuit initiating deployment of the occupant protective apparatus. Once contact is made, the flapper 101 can continue to rotate for an additional amount sufficient to assure that the contact dwell is long enough to overlap with an arming sensor, if present, and provide enough current to ignite the squib which initiates the gas generator which, in turn, inflates the air bag.

Testing is achieved by applying a current, typically less than 2 amps, to the coil 110. When such a current is present, a magnetic circuit composed of the metal housing 111, a pole 112, an orifice plate 106 and the flapper 101 leads the flux lines so as to create an attractive force between the pole 112 and the flapper 101 drawing the flapper into contact with the pole and causing contact 107 to engage contact 108 and complete the circuit.

Figure 9:
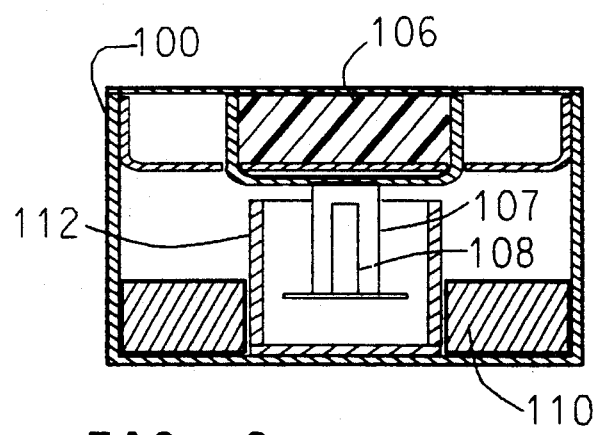
FIG. 9 is a transverse cross sectional view of the testable side impact sensor depicted in FIG. 8, viewed along 9—9.

FIG. 9 is a cross sectional view through the sensor of FIG. 8 along lines 9—9.

Figure 11:
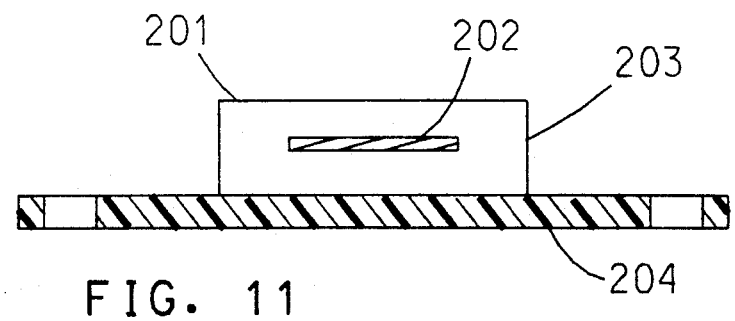
FIG. 11 is a transverse cross sectional conceptional view of an electronic side impact crash sensor.

FIG. 11 is a conceptional view of an electronic sensor assembly 201 built according to the teachings of this invention. This sensor contains a sensing mass 202 which moves relative to housing 203 in response to the acceleration of housing 203 which accompanies a side impact crash. The motion of the sensing mass 202 can be sensed by a variety of technologies using, for example, optics, resistance change, capacitance change or magnetic reluctance change. Output from the sensing circuitry can be further processed to achieve a variety of sensor response characteristics as desired by the sensor designer.

In the U.S. Pat. No. 3,522,575 of Watson et al, an adhesive coating is applied to conductive materials and thus hermetical sealing is obtained between the conductor and the plastic for electrical connectors. The coating material mentioned in that patent is a phenolic resin with 6 percent content of polyvinyl chloride. Sealing is very critical to the operation of crash sensors. The interior of a crash sensor must be protected from dust and moisture to avoid malfunctioning. The current technique used to seal sensors includes surrounding the sensor by a sand-epoxy mixture. This technique is not reliable, is expensive and adds a great deal of weight to the sensor.

If the technique of metal-plastic coating is applied to crash sensors as suggested in this invention, the bonding between the conductor and the plastic of a sensor can be insured within the operating temperature range for crash sensors, which is usually specified at from $-40°$ F. to 250° F. Not only crash sensors, but also many other devices containing electrical conductors used on vehicles, will benefit from this application of bonding between conductors and plastics. Such bonding can be provided by a resilient coating material, such as the one disclosed in the patent to Watson et al.

Although the preferred application of the sensors described and illustrated in this disclosure is for sensing side impacts, the thin flat shape of these sensors makes them applicable for certain frontal crush zone applications as described in copending U.S. patent application Ser. No. 07/480,257 filed on Feb. 15, 1990. Similarly, the low manufacturing cost and testable features makes some of the sensors described herein applicable for passenger compartment safing and discriminating applications as disclosed in copending U.S. patent application Ser. No. 07/480,271 also filed on Feb. 15, 1990.

Although several preferred embodiments are illustrated and described above, there are possible combinations using other geometries, materials and different dimensions of the components that can perform the same function. Therefore, this invention is not limited to the above embodiments and should be determined by the following claims.

I claim:

1. A side impact crash sensor for a vehicle having front and rear wheels, said sensor comprising:
    (a) a housing;
    (b) a mass within said housing movable relative to said housing in response to accelerations of said housing;
    (c) means responsive to the motion of said mass upon acceleration of said housing in excess of a predetermined threshold value, for initiating an occupant protection apparatus; and (d) means for mounting said housing onto at least one of a side door of the vehicle and a side of the vehicle between the centers of the front and rear wheels, in such a position and a direction as to sense an impact into the side of said vehicle.

2. The invention in accordance with claim 1, wherein said responsive means comprises a first contact means and a second contact means.

3. The invention in accordance with claim 2, wherein said first contact means biases said mass toward a first position in said housing.

4. The invention in accordance with claim 3, wherein said bias provided by said first contact has an average magnitude of 5 to 15 G's between the travel of said mass from a first resting position to a second actuating position.

5. The invention in accordance with claim 1, wherein said mass and said housing are made of plastic.

6. The invention in accordance with claim 5, wherein said mass is attached to said housing by a hinge.

7. The invention in accordance with claim 6, wherein said hinge is made of plastic.

8. The invention in accordance with claim 5, wherein the interior of said housing is sealed.

9. The invention in accordance with claim 1, wherein said crash sensor is installed inside the side skin of a vehicle.

10. The invention in accordance with claim 1 wherein said sensor has a thickness in the sensing direction which is smaller that its width or height.

11. The invention in accordance with claim 1, wherein electronic means are provided to sense the motion of said mass.

12. The invention in accordance with claim 1 wherein means are provided to dampen the motion of said mass.

13. The invention in accordance with claim 12, wherein said damping means comprises restrictor means to achieve inertial gas flow.

14. The invention in accordance with claim 12, wherein said damping means comprises restrictor means to achieve viscous gas flow.

15. The invention defined in claim 1, further comprising a side impact safing sensor including:
(a) a switch comprising a first contact member and a second contact member;
(b) means for mounting said switch on the side structure of a vehicle;
(c) means for forcing said first contact member to contact said second contact member, and causing said switch to change its conductive state when said vehicle is impacted in a side crash; and
(d) means for mounting said sensor onto the side of a vehicle in a position to sense an impact into the side of said vehicle; said side impact crash sensor and said safing sensor being electrically connected together such that both sensors must sense an impact into the side of the vehicle to initiate the occupant protection apparatus.

16. The invention in accordance with claim 1 wherein means are provided to render said sensor testable.

17. The invention in accordance with claim 1 wherein said mass has a substantially rectangular cross section.

18. The invention in accordance with claim 1 wherein said mass has a substantially circular cross section.

19. The invention in accordance with claim 1, wherein said housing is installed in the side door structure of the vehicle.

20. A side-impact sensor for a vehicle having front and rear wheels, said sensor comprising:
(a) a housing;
(b) an acceleration sensing mass within said housing;
(c) means for biasing said sensing mass within said housing toward a first position;
(d) means responsive to the motion of said mass to a second position upon acceleration of said housing in excess of a predetermined threshold value;
(e) means for mounting said housing onto at least one of a side door of vehicle and a side of the vehicle between the centers of the front and rear wheels, in such a position and a direction as to sense an impact into the side of said vehicle; whereby said sensor responds to a designed velocity change function in a side impact crash.

21. The invention in accordance with claim 20, wherein said sensor has a width, or height larger than its thickness.

22. The invention in accordance with claim 20, wherein the motion of said sensing mass is affected by a damping force.

23. The invention in accordance with claim 22, wherein said damping force is substantially proportional to the velocity of said sensing mass.

24. The invention accordance with claim 22, wherein said damping force is substantially proportional to the square of the velocity of sensing mass.

25. The invention in accordance with claim 20, wherein said biasing means provides a force having an average magnitude of 5 to 15 G's as said sensing mass moves from said first position to said second position.

26. The invention in accordance with claim 20, wherein said sensor is installed inside the side skin of a vehicle.

27. The invention in accordance with claim 20 wherein means are provided to require a larger marginal velocity change to trigger said sensor for short pulses than for longer pulses.

28. The invention in accordance with claim 20, wherein said housing is installed in the side door structure of the vehicle.

29. A side impact sensor system for a vehicle having front and rear wheels, said sensor comprising:
(a) at least one discriminating sensor comprising an acceleration sensing mass;
(b) at least one safing sensor comprising a switch responsive to a force from a side impact;
(c) means for mounting said discriminating sensor and said safing sensor onto at least one of a side door of the vehicle and a side of the vehicle between the centers of the front and rear wheels, in such a position and a direction as to sense an impact into the side of said vehicle;
(d) means to connect said discrimination sensor together with said safing sensor such that both sensors are required to trigger to initiate deployment of an occupant restraint system.

30. A side impact crash sensor for a vehicle having front and rear wheels, said sensor comprising:
(a) a housing having a total thickness in the sensing direction less than both its height and width, said housing having a cavity within;
(b) a mass disposed within said housing cavity and movable relative to said housing in response to accelerations of said housing;
(c) means responsive to the motion of said mass upon acceleration of said housing in excess of a predetermined threshold value, for initiating an occupant protection apparatus; and (d) means for mounting said housing onto at least one of a side door of the vehicle and a side of the vehicle between the centers of the front and rear wheels, in such a position and a direction as to sense an impact into side of said vehicle.

31. The invention in accordance with claim 30, wherein said responsive means comprises a first contact means and a second contact means.

32. The invention in accordance with claim 31, wherein said first contact means biases said mass toward a first position in said housing.

33. The invention in accordance with claim 32, wherein said bias provided by said first contact means provides a force on said mass having an average magnitude of 5 to 15 G's between the travel of said mass from a first resting position to a second actuating position.

34. The invention in accordance with claim 30, wherein said mass and said housing are made of plastic.

35. The invention in accordance with claim 34 wherein said mass is attached to said housing by a hinge.

36. The invention in accordance with claim 35, wherein said hinge is made of plastic.

37. The invention in accordance with 34, wherein the interior of said housing is sealed.

38. The invention in accordance with claim 30, wherein said crash sensor is installed inside the side skin of a vehicle.

39. The invention in accordance with claim 30, wherein electronic means are provided to sense the motion of said mass.

40. The invention in accordance with claim 30 wherein the motion of said sensing mass is damped.

41. The invention in accordance with claim 40, wherein said damping involves the inertial gas flow through a restriction.

42. The invention in accordance with claim 40, wherein said damping involves the viscous gas flow through a restriction.

43. The invention in accordance with claim 30 wherein said mass is supported by said housing by a hinge comprising a knife edge and groove, said knife edge being arranged in said groove to form a low friction pivot.

44. The invention in accordance with claim 30, wherein said housing is installed in the side door structure of the vehicle.

45. A sensing device, comprising:
(a) a housing having a cavity within;
(b) sensing mechanism disposed in said cavity;
(c) conductive connectors, extending from said mechanism to the outside of said housing;
(d) a plastic wall of said housing, through which said connectors pass; and
(e) means of bonding said plastic wall and said connector utilizing a metal-plastic adhesive coating material applied to said connectors prior to insert molding, to prevent separation caused by temperature variations; whereby said sensing device is hermetically sealed.

* * * * *